(12) United States Patent
Arai et al.

(10) Patent No.: US 8,936,132 B2
(45) Date of Patent: Jan. 20, 2015

(54) MOTOR DRIVEN POWER STEERING APPARATUS

(75) Inventors: Isamu Arai, Tochigi (JP); Yosuke Hamaguchi, Tochigi (JP); Satoshi Aiko, Tochigi (JP); Kenta Sugimoto, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 13/528,707

(22) Filed: Jun. 20, 2012

(65) Prior Publication Data

US 2013/0239712 A1    Sep. 19, 2013

(30) Foreign Application Priority Data

Oct. 24, 2011   (JP) .................. 2011-233000

(51) Int. Cl.
*B62D 5/04*   (2006.01)
*F16H 19/06*  (2006.01)
*B62D 6/10*   (2006.01)
*B60R 16/027* (2006.01)
*G01L 5/22*   (2006.01)

(52) U.S. Cl.
CPC .......... *F16H 19/0618* (2013.01); *B62D 5/0421* (2013.01); *B62D 6/10* (2013.01); *B60R 16/027* (2013.01); *G01L 5/221* (2013.01); *B62D 5/0409* (2013.01)
USPC .......................................... 180/444; 180/443

(58) Field of Classification Search
USPC ........................................ 180/443, 444, 446
See application file for complete search history.

(56) References Cited

U.S. PATENT DOCUMENTS 5,482,128 A * 1/1996 Takaoka et al. ............... 180/444
6,000,491 A * 12/1999 Shimizu et al. ............... 180/444

FOREIGN PATENT DOCUMENTS

JP    H11-118631    4/1999
JP    2008-037189   2/2008

* cited by examiner

*Primary Examiner* — Joseph M Rocca
*Assistant Examiner* — Marc A Scharich
(74) *Attorney, Agent, or Firm* — Keith H. Orum; Orum & Roth, LLC

(57) ABSTRACT

In a motor-driven power steering apparatus, in an intermediate assembled state in which an input shaft, an output shaft, a torsion bar, a worm gear, a worm wheel, a torque detecting apparatus and a spiral cable are assembled in a gear housing, and an electric motor is not assembled yet, a rotation preventing arm which prevents the worm gear from rotating is loaded with respect to the gear housing.

20 Claims, 12 Drawing Sheets

MOTOR DRIVEN POWER STEERING APPARATUS

BACKGROUND OF THE INVENTION

1. Field of the Invention

The present invention relates to a motor-driven power steering apparatus.

2. Description of the Related Art

In a motor-driven power steering apparatus, as shown in Japanese Patent Application Laid-Open (JP-A) No. 11-118631 (patent document 1) and JP-A No. 2008-37189 (patent document 2), there is a structure in which an input shaft and an output shaft are coaxially coupled via a torsion bar. A drive gear to which an electric motor is coupled is pivoted to a gear housing. A driven gear engaging with the drive gear is fixed to an intermediate portion of the output shaft. A torque detecting structure detecting a steering torque applied to the input shaft is provided between the input shaft and the output shaft. A spirally wounded spiral cable is provided around the same axis of the input shaft and the output shaft in an inner portion of the gear housing. One end portion of the spiral cable is connected to the torque detecting structure, another end portion of the spiral cable is connected to a detection result pickup portion. Driving of the electric motor is controlled on the basis of a steering torque which the torque detecting structure detects.

In a manufacturing process of the motor-driven power steering apparatuses which are described in JP-A Nos. 11-118631 and 2008-37189, there is a handling stage such as a stage of conveying an intermediate assembly which is assembled with the input shaft, the output shaft, the torsion bar, the drive gear, the driven gear, the torque detecting structure and the spiral cable into the gear housing, but the electric motor has not been assembled yet, and the like.

In the handling stage of the intermediate assembly mentioned above, conventionally the rotation of the input shaft, the output shaft and the gear shaft of the drive gear which are exposed from the gear housing is not regulated, and these shafts can be easily rotated by an external rotating force. When these shafts are freely rotated, the spiral cable in an inner portion of the gear housing is freely wound around. In accordance with this, a number of winding is increased or decreased in comparison with a state in which a winding state of the spiral cable is neutral. In the case that the number of winding of the spiral cable is abnormally increased, a disconnection of the spiral cable or the like is caused, and there is a risk that the torque can not be detected. In the case that the number of winding is decreased, the spiral cable is stuck fast to the spiral cable cover, and an increase of the steering torque may be caused.

SUMMARY OF THE INVENTION

An object of the present invention is to regulate a free rotation of an input shaft, an output shaft and a gear shaft of a drive gear in a handling stage of an intermediate assembly of a motor-driven power steering apparatus, and prevent a spiral cable from being abnormally wound around.

In accordance with one embodiment of the present invention, there is provided a motor-driven power steering apparatus comprising an input shaft and an output shaft being coaxially connected via a torsion bar. A drive gear is connected to an electric motor, the drive gear being pivoted to a gear housing. A driven gear engages with the drive gear, the driven gear being fixed to an intermediate portion of the output shaft. A torque detecting structure detects a steering torque applied to the input shaft, the torque detecting structure being provided between the input shaft and the output shaft. A spiral cable is spirally wound around the same axis of the input shaft and the output shaft in an inner portion of the gear housing. One end portion of the spiral cable is connected to the torque detecting structure, another end portion of the spiral cable is connected to a detection result pickup portion, and driving of the electric motor is controlled on the basis of a steering torque which the torque detecting structure detects. In an intermediate assembled state in which the input shaft, the output shaft, the torsion bar, the drive gear, the driven gear, the torque detecting structure and the spiral cable are assembled in the gear housing, and the electric motor is not assembled yet, a rotation preventing structure which prevents the drive gear from rotating is loaded with respect to the gear housing.

In accordance with another embodiment of the present invention, the rotation preventing structure is constructed by a rotation preventing arm, and the rotation preventing arm has a boss portion which is coupled to a serration provided in the gear shaft of the drive gear, and a locking portion which locks to a stopper provided in the gear housing.

In accordance with another embodiment of the present invention, the boss portion of the rotation preventing arm is provided with an inner peripheral projection which is connected to at least a part of the serration provided in the gear shaft of the drive gear at a plurality of positions in a peripheral direction of an inner periphery of the boss portion. The locking portion is provided with an outer peripheral projection which locks to a stopper provided in the gear housing.

In accordance with another embodiment of the present invention, the boss portion of the rotation preventing arm is formed as a cylindrical shape. A grip portion is radially protruded from a plurality of positions in a tube outer periphery in a base end side of the boss portion, and the locking portion is radially protruded from a plurality of positions of a tube outer periphery in a leading end side of the boss portion.

In accordance with another embodiment of the present invention, a stopper is provided in the gear housing in such a manner that the locking portion of the rotation preventing arm locks thereto is a tool engaging surface which is provided in an inner periphery of a nut threadably attached by screw to the gear housing for retaining a bearing in the gear housing, and the bearing pivots the gear shaft of the drive gear to the gear housing.

In accordance with another embodiment of the present invention, a stopper is provided in the gear housing in such a manner that the locking portion of the rotation preventing arm locks thereto is a locking convex portion which is provided in an inner surface of the gear housing and to which the locking portion of the rotation preventing arm is fitted.

In accordance with another embodiment of the present invention, the boss portion of the rotation preventing arm is formed as a cylindrical shape. A grip portion and a locking portion is protruded to an outer side in a radial direction from a tube outer peripheral in a base end side of the boss portion, and a concave portion provided in the locking portion is fitted to the locking convex portion.

In accordance with another embodiment of the present invention, a stopper is provided in the gear housing in such a manner that the locking portion of the rotation preventing arm locks thereto is a locking surface portion which is provided in an inner surface of the gear housing, and with which the locking portion of the rotation preventing arm is engaged.

In accordance with another embodiment of the present invention, a stopper is provided in the gear housing in such a manner that the locking portion of the rotation preventing arm locks thereto is a locking hole portion which is open to an inner surface of the gear housing, and into which the locking portion of the rotation preventing arm is locked.

In accordance with another embodiment of the present invention, the boss portion of the rotation preventing arm is formed as a cylindrical shape. A lever portion of the locking portion is protruded to an outer side in a radial direction from a tube outer periphery in a base end side of the boss portion. A locking pin is provided in a leading end of the lever portion, and the locking pin is locked to the locking hole portion.

In accordance with another embodiment of the present invention, in a state in which the rotation preventing arm is loaded, the rotation preventing arm is accommodated in an inner portion of a cup-shaped portion to which the electric motor of the gear housing is attached.

In accordance with another embodiment of the present invention, the drive gear is constructed by a worm gear.

In accordance with the present embodiment, the following operations and effects can be achieved.

(a) In the intermediate assembled state in which the input shaft, the output shaft, the torsion bar, the drive gear, the driven gear, the torque detecting structure and the spiral cable are assembled in the gear housing, and the electric motor is not assembled yet, the rotation preventing structure which prevents the drive gear from rotating is loaded with respect to the gear housing. Accordingly, in the handling stage of the intermediate assembly in which the input shaft, the output shaft and the gear shaft of the drive gear are exposed to the external portion of the gear housing, even if the external rotating force acts on these shafts, the rotation preventing structure regulates a free rotation of these shafts. In accordance with this, the winding state of the spiral cable is maintained in the neutral state, and an abnormal winding of the spiral cable is prevented. An abnormal increase of the number of winding of the spiral cable is avoided, a disconnection of the spiral cable is not caused, and a torque detecting function is not deteriorated. In the case that the number of winding is decreased, the spiral cable is stuck fast to the spiral cable cover, and an increase of steering torque is caused.

(b) The rotation preventing structure is constructed by the rotation preventing arm. The rotation preventing arm has the boss portion which is coupled to the serration provided in the gear shaft of the drive gear, and the locking portion which locks to the stopper provided in the gear housing.

It is possible to easily regulate the free rotation of the gear shaft of the drive gear, and further the input shaft and the output shaft, by coupling the boss portion of the rotation preventing arm to the serration provided in the gear shaft of the drive gear, and locking the locking portion to the stopper provided in the gear housing.

(c) The stopper provided in the gear housing in such a manner that the locking portion of the rotation preventing arm locks thereto is the tool engaging surface which is provided in the inner periphery of the nut threadably attached by screw to the gear housing for retaining the bearing pivoting the gear shaft of the drive gear to the gear housing in the gear housing.

The engaging portion of the rotation preventing arm can be locked to the tool engaging surface (the stopper) in the inner periphery of the nut which is threadably attached by screw to the gear housing.

(d) The stopper provided in the gear housing in such a manner that the locking portion of the rotation preventing arm locks thereto is the locking convex portion which is provided in the inner surface of the gear housing and to which the locking portion of the rotation preventing arm is fitted.

The locking portion of the rotation preventing arm can be fitted and locked to the locking convex portion (the stopper) which is provided in the inner surface of the gear housing.

(e) The stopper provided in the gear housing in such a manner that the locking portion of the rotation preventing arm locks thereto is the locking surface portion which is provided in the inner surface of the gear housing, and with which the locking portion of the rotation preventing arm is engaged.

The locking portion of the rotation preventing arm can be engaged with and locked to the locking surface portion (the stopper) which is provided in the inner surface of the gear housing.

(f) The stopper provided in the gear housing in such a manner that the locking portion of the rotation preventing arm locks thereto is the locking hole portion which is open to the inner surface of the gear housing, and into which the locking portion of the rotation preventing arm is locked.

The locking portion of the rotation preventing arm can be locked into the locking hole portion (the stopper) which is open to the inner surface of the gear housing.

(g) In the state in which the rotation preventing arm is loaded, the rotation preventing arm is accommodated in the inner portion of the cup-shaped portion to which the electric motor of the gear housing is attached.

The rotation preventing arm is accommodated in the inner portion of the cup-shaped portion rather than the flat surface including the open end surface to which the motor case of the cup-shaped portion in the gear housing is attached, and protrudes to the external portion from the cup-shaped portion so as to be prevented from coming into collision with the peripheral article.

(h) The drive gear may be formed as the worm gear.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
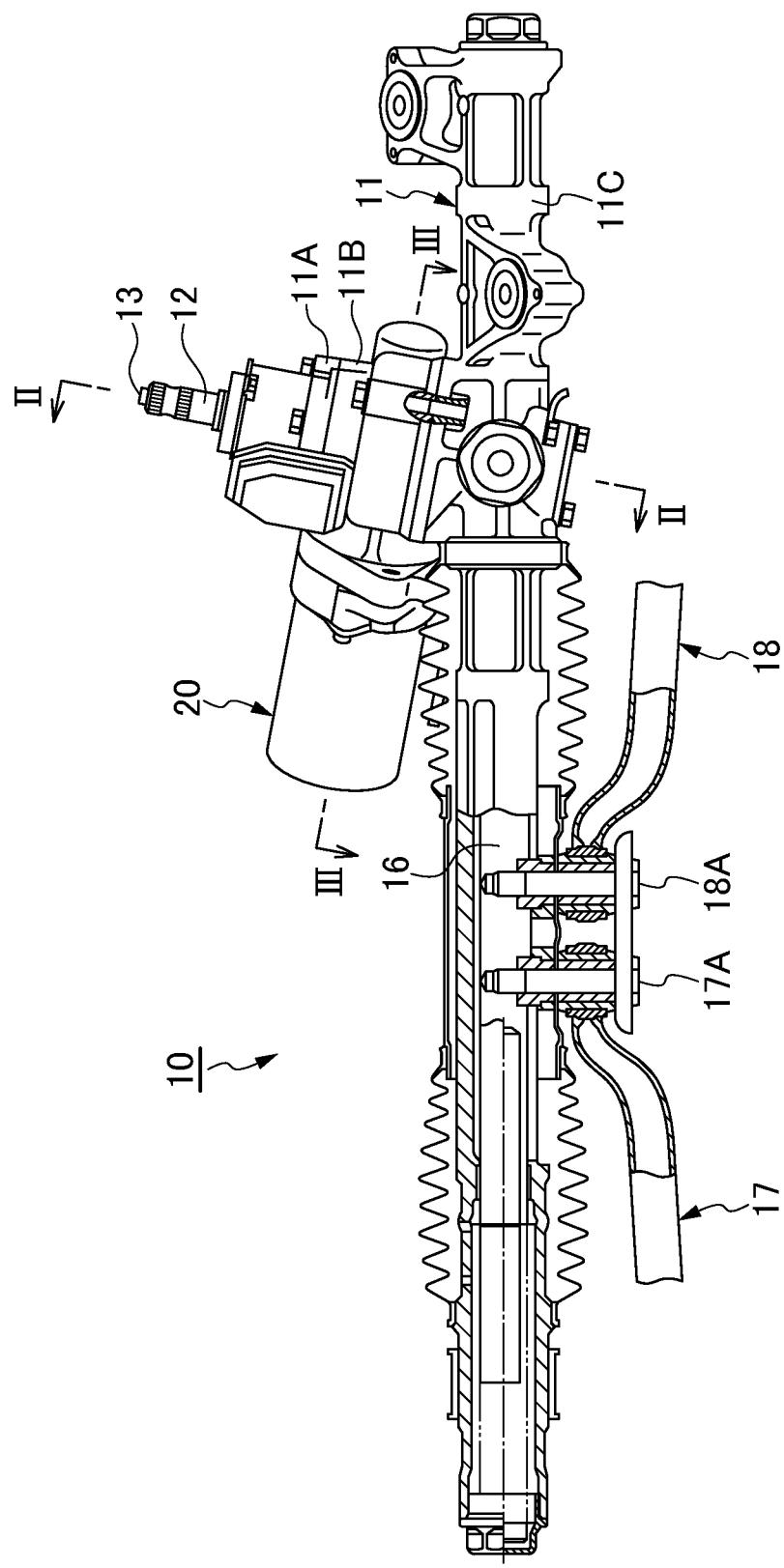
FIG. 1 is a general view showing a motor-driven power steering apparatus.
Figure 2:
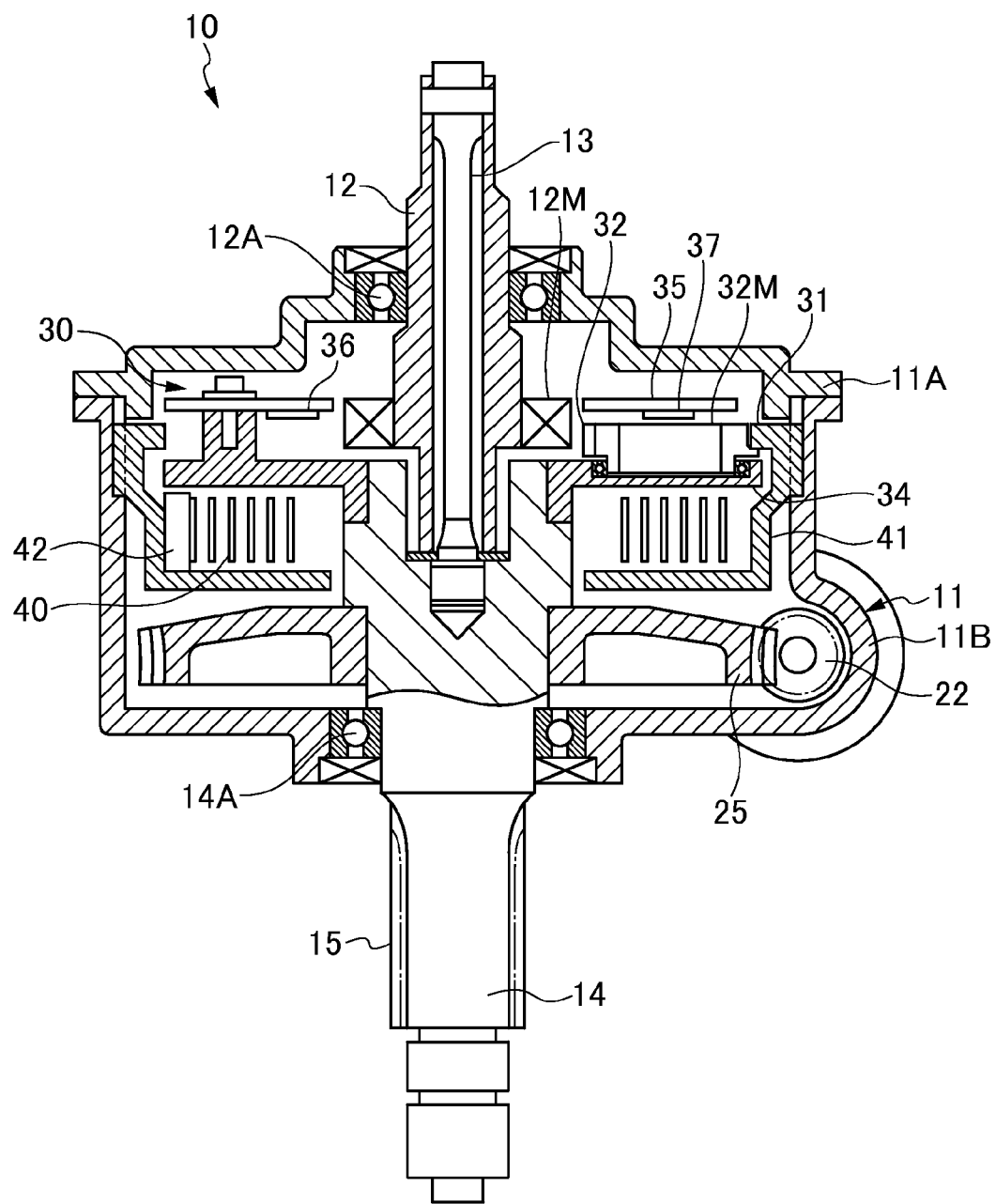
FIG. 2 is a cross sectional view along a line II-II in FIG. 1.

A motor-driven power steering apparatus 10 has a gear housing 11 which is fixed to a vehicle body frame or the like by a bracket (not shown), as shown in FIG. 1 and FIG. 2. Further, an output shaft 14 is coaxially coupled to an input shaft 12 to which a steering wheel is connected, via a torsion bar 13. A pinion 15 is provided in the output shaft 14, and a rack shaft 16 provided with a rack engaging with the pinion 15 is supported to a gear housing 11 in such a manner as to be linearly movable right and left. Left and right tie rods 17 and 18 are connected to an intermediate portion of the rack shaft 16 by connecting bolts 17A and 18A. In this case, the input shaft 12 and the output shaft 14 are supported to the gear housing 11 via bearings 12A and 14A.

In this case, the gear housing 11 is constructed by first and second gear housings 11A and 11B which pivot the input shaft 12 and the output shaft 14, and a third gear housing 11C which supports the rack shaft 16.

A torque detecting apparatus 30 (a torque detecting structure) detecting a steering torque applied to the input shaft 12 from the steering wheel by a driver is provided between the input shaft 12 and the output shaft 14. The torque detecting apparatus 30 will be in detail mentioned later.

Figure 3:
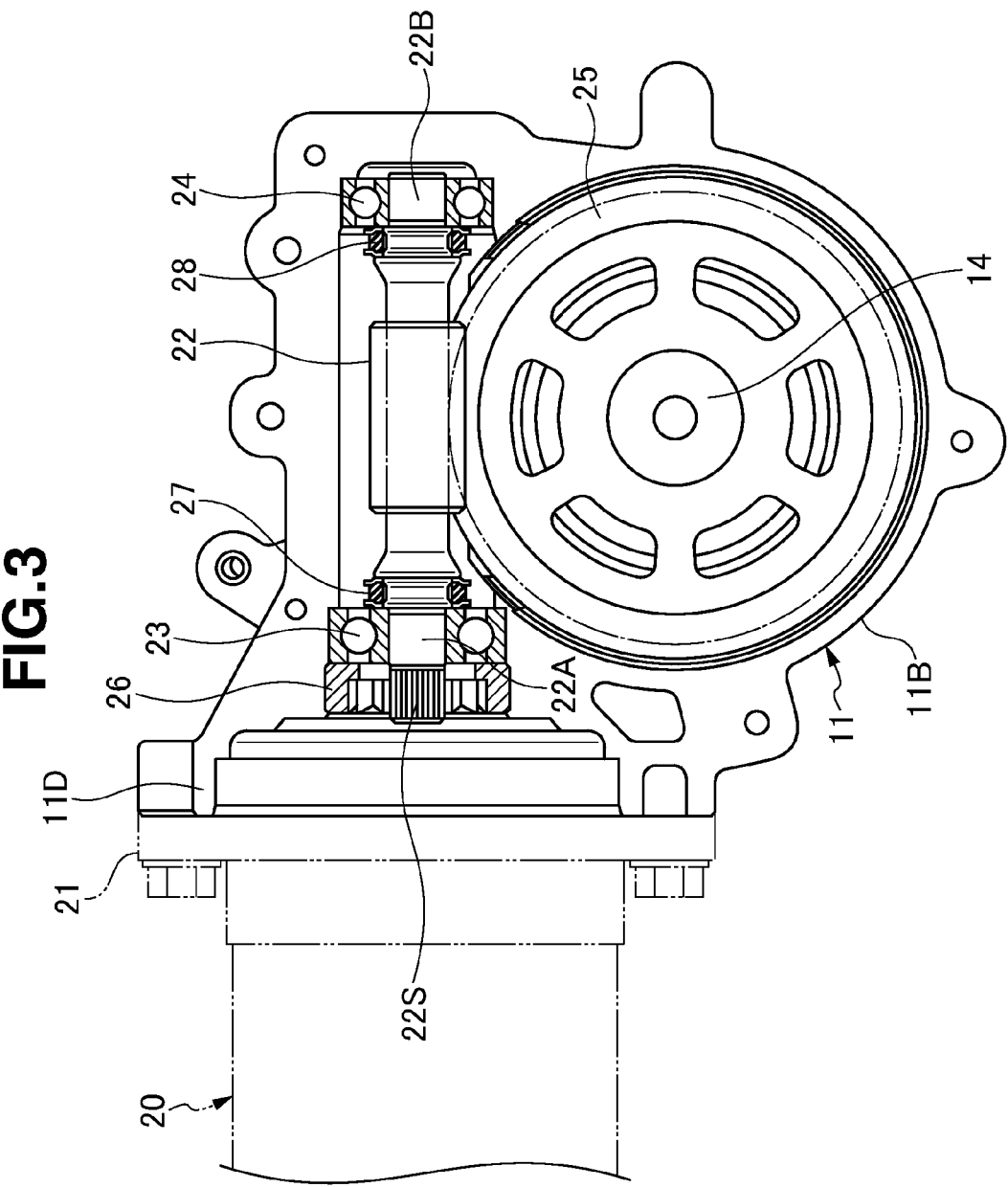
FIG. 3 is a cross sectional view along a line III-III in FIG. 1.

A motor case 21 of an electric motor 20 is attached to the gear housing 11 (11B) as shown in FIG. 3. Gear shafts 22A and 22B in both ends of a worm gear 22 (a drive gear) to which the electric motor 20 is coupled via a coupling (not shown) are pivoted to the gear housing 11B by bearings 23 and 24. A worm wheel 25 (a driven gear) engaging with the worm gear 22 is fixed to an intermediate portion of the output shaft 14. The gear housing 11B has a cup-shaped portion 11D (FIG. 3) to which the motor case 21 of the electric motor 20 is attached, and accommodates the coupling or the like for coupling to the electric motor 20 in an inner portion of the cup-shaped portion 11D.

In an intermediate assembled state mentioned later of the motor-driven power steering apparatus 10, in an outer periphery of the gear shaft 22A of the worm gear 22 which is exposed to an external portion from the gear housing 11 (11B), there is provided a serration 22S to which the coupling for connecting to the electric motor 20 is connected by serration. In this case, the bearing 23 is retained in such a manner that an outer ring is pinched with respect to a step surface of a bearing hole of the gear housing 11B by a nut 26 which is threadably attached by screw to the gear housing 11B. Reference numerals 27 and 28 denote elastic support devices which elastically support the worm gear 22 from both sides in an axial direction.

Figure 4:
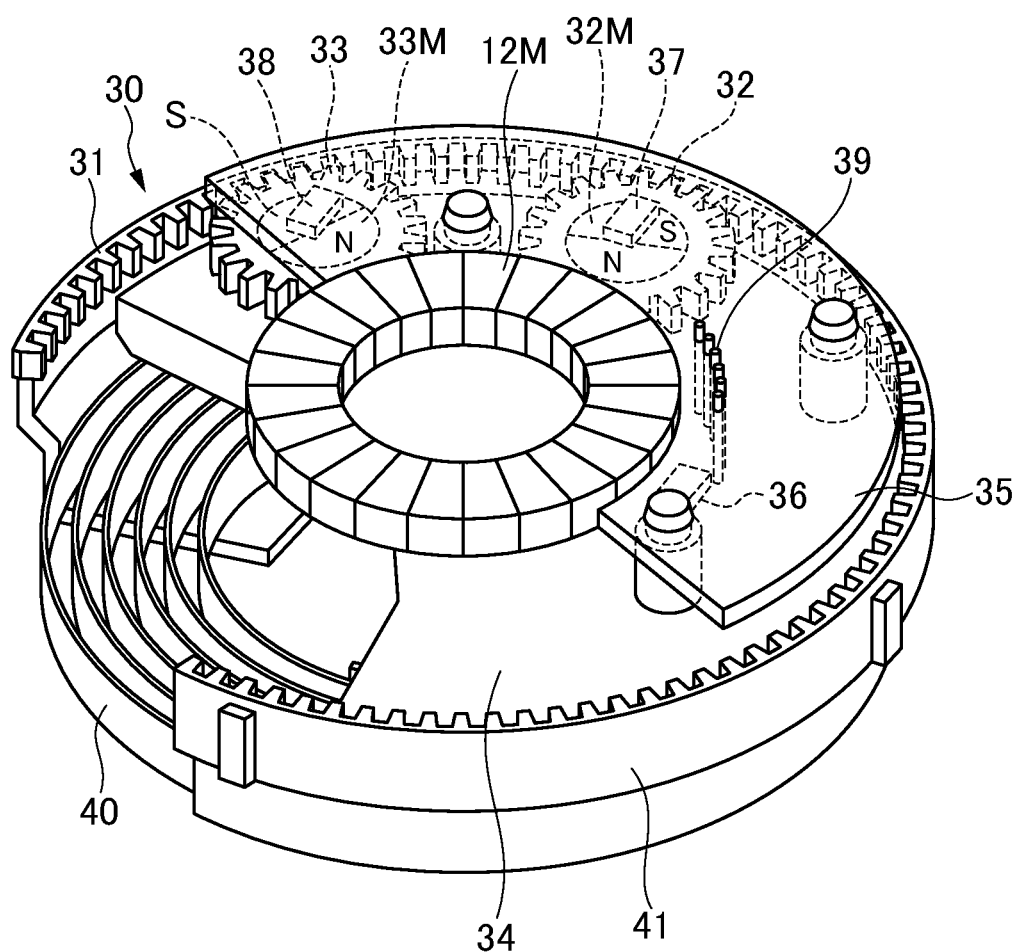
FIG. 4 is a perspective view showing a torque detecting apparatus.

In this case, a spiral cable 40 structured such as to be wound spirally around the same axis of the input shaft 12 and the output shaft 14 is stored in an inner portion of the gear housing 11 (11A and 11B), as shown in FIG. 2 and FIG. 4. One end portion of the spiral cable 40 is connected to a torque detecting apparatus 30, and another end portion of the spiral cable 40 is connected to a detection result pickup portion 42. Further, the spiral cable 40 is wound in a rightward direction as shown in FIG. 4 in the case of viewing from one side in the axial direction. In the case that the steering wheel, in other words, the input shaft 12 and the output shaft 14 are rotated in the rightward direction, the one end portion rotates in the rightward direction in accordance with the rotation of the output shaft 14, and the number of winding is increased in comparison with the neutral state in which the steering wheel is not rotated. On the other hand, in the case that the steering wheel is rotated in a leftward direction, the number of winding is decreased in comparison with the neutral state in which the steering wheel is not rotated.

As mentioned above, in the motor-driven power steering apparatus 10, the detection signal of the torque detecting apparatus 30 is picked up to the detection result pickup portion 42 via the spiral cable 40, and an output signal of the detection result pickup portion 42 is transferred to an electronic control unit (ECU) (not shown). The ECU controls a driving of the electric motor 20 on the basis of a steering torque which the torque detecting apparatus 30 detects. Further, a generation torque of the electric motor 20 is transferred to the output shaft 14 via the worm gear 22 and the worm wheel 25, and the steering torque of the driver which is applied to the steering wheel is assisted.

A description will be in detail given below of the torque detecting apparatus 30. The torque detecting apparatus 30 in accordance with the present embodiment computes a relative angle between the input shaft 12 and the output shaft 14 so as to detect the steering torque which is applied to the input shaft 12. Further, the torque detecting apparatus 30 also computes an angle of rotation of the output shaft 14, and detects the current position (a steering angle) of the output shaft 14 and the rack shaft 16.

The torque detecting apparatus 30 has a first magnet 12M which is attached to the input shaft 12, and a first gear 31 which is fixed to the gear housing 11 (11B), as shown in FIG. 2 and FIG. 4. Further, the torque detecting apparatus 30 has a second gear 32 as one example of a first driven gear which engages with the first gear 31 while revolving around the axis of the output shaft 14 as a center of rotation in accordance with the rotation of the output shaft 14 so as to self rotate. Further, the torque detecting apparatus 30 has a third gear 33 which engages with the first gear 31 while revolving around the axis of the output shaft 14 as a center of rotation in accordance with the rotation of the output shaft 14 so as to self rotate, and has a different number of gears from the number of gears of the second gear 32. The third gear 33 is one example of a second driven gear.

The first magnet 12M is formed as a donut shape, is fitted with the input shaft 12 in an inner side thereof, and rotates together with the input shaft 12. Further, N poles and S poles are alternately arranged on at least an outer peripheral surface.

The first gear 31 is a gear which is provided in a whole periphery of an inner peripheral surface in an upper portion of the spiral cable cover 41. The spiral cable cover 41 is fixed to the gear housing 11 (11B), whereby the first gear 31 is fixed to the gear housing 11 (11B).

The torque detecting apparatus 30 has a base 34 which is fixed to the output shaft 14 and rotates together with the output shaft 14. Further, the second gear 32 and the third gear 33 are rotatably supported to the base 34. In other words, the second gear 32 and the third gear 33 are provided so as to be rotatable around the axis of the output shaft 14 as a center of rotation with respect to the spiral cable cover 41 which is fixed to the gear housing 11 (11B).

A columnar second magnet 32M having a semicolumnar N pole and a semicolumnar S pole is installed to an inner side of the second gear 32, for example, by insert molding. Further, a columnar third magnet 33M having a semicolumnar N pole and a semicolumnar S pole in the same manner is installed to an inner side of the third gear 33, for example, by insert molding. One example of a first driven body is constructed by the second gear 32 and the second magnet 32M, and one example of a second driven body is constructed by the third gear 33 and the third magnet 33M.

A printed circuit board 35 on which a wiring pattern (not shown) is formed is installed to the base 34, for example, by a screwing or the like, in such a manner that a predetermined gap is formed between the second gear 32 and the third gear 33. In other words, the printed circuit board 35 is provided in such a manner as to be rotatable around the axis of the output shaft 14 as the center of rotation, with respect to the spiral cable cover 41 which is fixed to the gear housing 11 (11B).

To the printed circuit board 35, as shown in FIG. 2 and FIG. 4, there is installed a relative angle sensor 36 in such a manner as to come to an outer side of an outer peripheral surface of the first magnet 12M in a radial direction of the input shaft 12, and come to a region provided with the first magnet 12M in the axial direction of the input shaft 12. The relative angle sensor 36 in accordance with the present embodiment can be exemplified as an MR sensor (a magneto resistive element) which corresponds to a magnetic sensor utilizing a fact that a resistance value is changed on the basis of a magnetic field. Further, the relative angle sensor 36 constructs a relative angle detecting structure which detects a relative angle between the input shaft 12 and the output shaft 14 on the basis of the magnetic field which is generated from the first magnet 12M.

Further, a first rotating angle sensor 37 corresponding to one example of the first detecting structure is installed to the printed circuit board 35, at a position which is opposed to the center portion of the second magnet 32M, in such a manner as to form a predetermined gap with respect to the second magnet 32M. Further, a second rotating angle sensor 38 corresponding to one example of the second detecting structure is installed to the printed circuit board 35 at a position which is opposed to the center portion of the third magnet 33M, in such a manner as to form a predetermined gap with respect to the third magnet 33M. The first and second rotating angle sensors 37 and 38 in accordance with the present embodiment can be exemplified as the MR sensor (the magneto resistive element). Further, the first and second rotating angle sensors 37 and 38 can construct a rotating angle detecting structure which detects an angle of rotation of the output shaft 14 on the basis of an angle of a self-rotation of the second gear 32 and an angle of a self-rotation of the third gear 33.

Further, a connector 39 which is electrically connected to a wiring pattern is attached to the printed circuit board 35, and a connector (not shown) which is provided in one leading end portion of the spiral cable 40 is connected to the connector 39. The spiral cable 40 is spirally wound in an inner side of the spiral cable cover 41 below the base 34, as shown in FIG. 2 and FIG. 4. Further, the one leading end portion of the spiral cable 40 is connected to the angle sensors 36, 37 and 38 via the connector 39 of the printed circuit board 35 above the base 34 via a hole which is formed in the base 34. Further, another leading end portion of the spiral cable 40 is connected to the detection result pickup portion 42 which is provided in the spiral cable cover 41 via a hole which is formed in the spiral cable cover 41. An output signal of the detection result pickup portion 42 is picked up to an external portion of the spiral cable cover 41, and is connected to a connector (not shown) which is provided in a printed circuit board (a control board) of the electronic control unit (ECU) (not shown) which carries out a control of the motor-driven power steering apparatus 10.

In this case, the torque detecting apparatus 30 is provided with a relative angle computing structure and/or software (not shown) which computes a relative angle between the input shaft 12 and the output shaft 14 on the basis of the detection value of the relative angle sensor 36. A rotating angle computing structure and/or software (not shown) computes the angle of rotation of the output shaft 14 on the basis of the detection values of the first and second rotating angle sensors 37 and 38. The relative angle computing structure and/or software constructs the relative angle detecting structure and/or software mentioned above, and the rotating angle computing structure and/or software constructs the rotating angle detecting structure and/or software mentioned above. Further, these computing structure and/or software may be installed to the printed circuit board (for example, the board provided in the ECU mentioned above) which is provided in the outer side of the spiral cable cover 41 independently from the printed circuit board 35, or may be installed to the printed circuit board 35.

In the case that the computing structure and/or software is installed to the printed circuit board which is different from the printed circuit board 35, the detection values of the relative angle sensor 36 and the first and second rotating angle sensors 37 and 38 are structured such as to be output to the computing structure and/or software via the spiral cable 40. Further, in the case that the computing structure and/or software is installed to the printed circuit board 35, after the relative angle or the angle of rotation is computed on the basis of the detection values of the relative angle sensor 36 and the first and second rotating angle sensors 37 and 38 by the computing structure and/or software, the computed result is output to the ECU via the spiral cable 40.

Figure 5A:
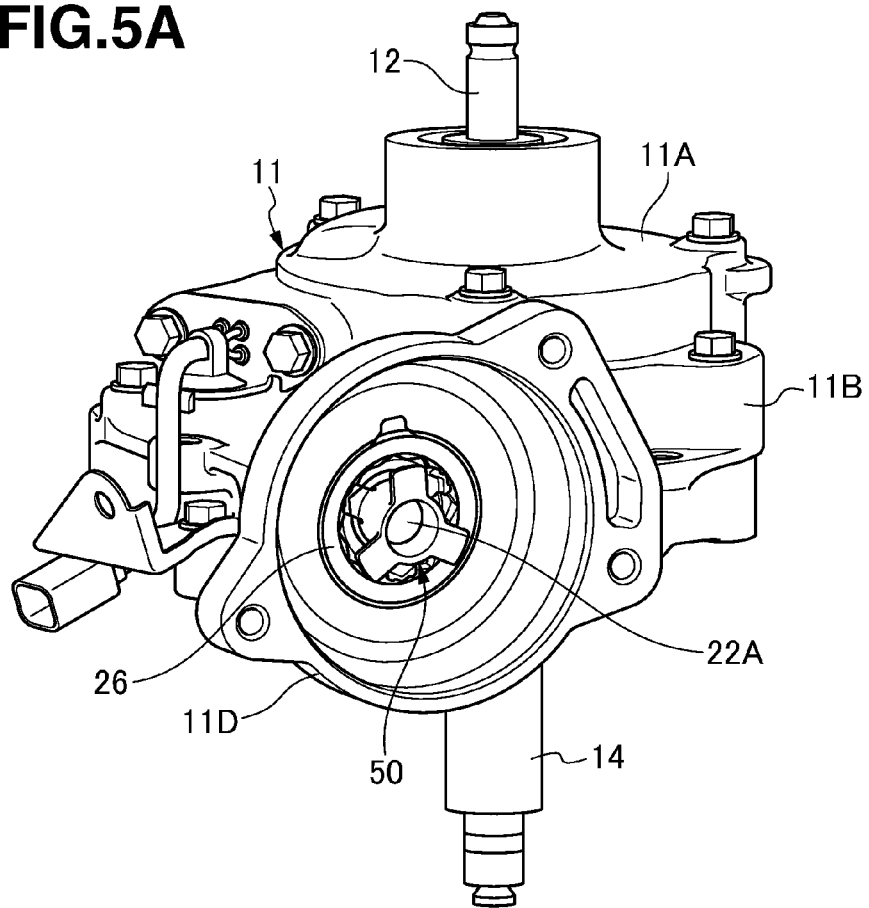
FIG. 5A and FIG. 5B are perspective views showing an intermediate assembly of the motor-driven power steering apparatus in accordance with a first embodiment.
Figure 5B:
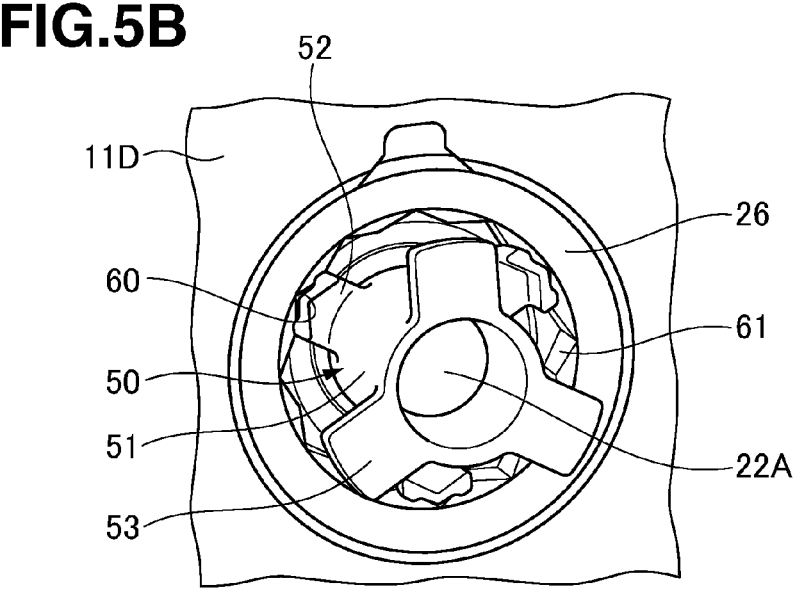
Figure 6:
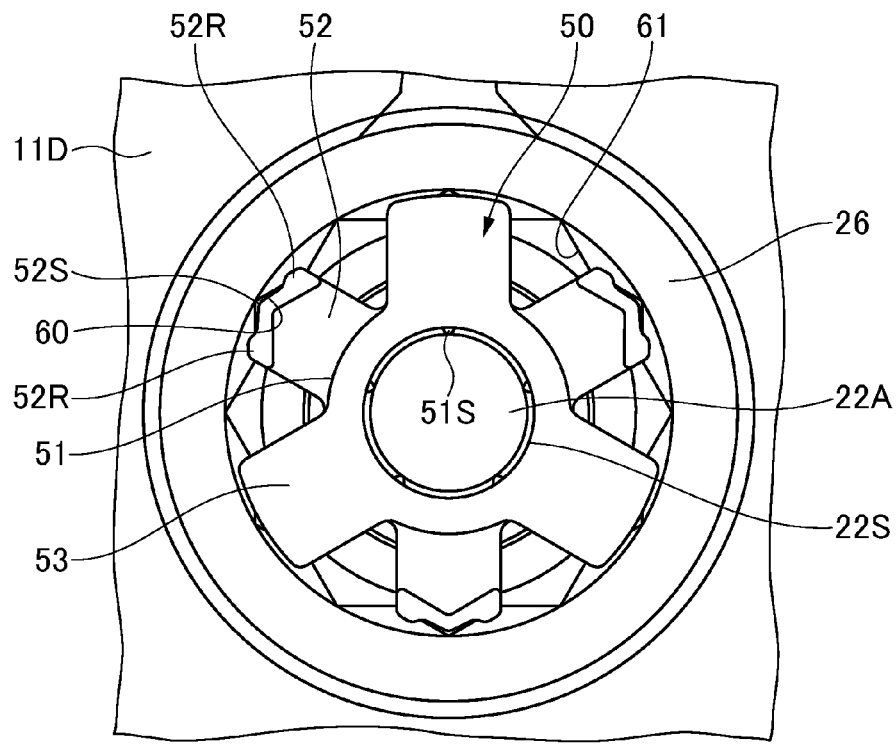
FIG. 6 is a front elevational view showing a used state of a rotation preventing arm.
Figure 7:
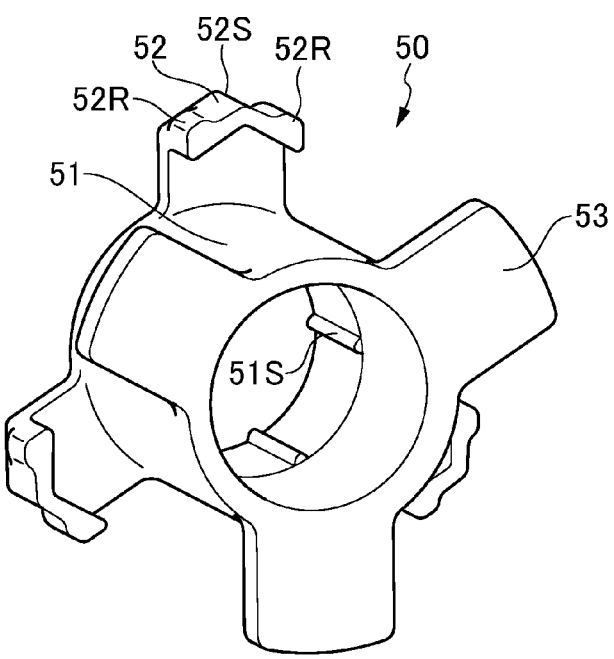
FIG. 7 is a perspective view showing a rotation preventing arm.

Accordingly, in the motor-driven power steering apparatus 10, as shown in FIG. 5A and FIG. 5B, in the handling stage of the intermediate assembly constructed by the intermediate assembled state in which the input shaft 12, the output shaft 14, the torsion bar 13, the worm gear 22, the worm wheel 25, the torque detecting apparatus 30 and the spiral cable 40 are assembled to the gear housing 11 (11B), and the electric motor 20 is not assembled yet, in order to regulate the free rotation of the input shaft 12, the output shaft 14 and the gear shaft 22A of the worm gear 22, and prevent the spiral cable 40 from being wound abnormally, the following structure is provided.

In other words, the motor-driven power steering apparatus 10 is loaded with a rotation preventing structure which prevents the worm gear 22 from being rotated with respect to the gear housing 11 (11B), in the intermediate assembled state mentioned above. In the present embodiment, the rotation preventing structure is constructed by the rotation preventing arm 50 shown in FIG. 5A to FIG. 7.

The rotation preventing arm 50 has a boss portion 51 which is provided with inner peripheral projections 51S connected to at least a part of the serration 22S provided in the gear shaft 22A connected to the electric motor 20 of the worm gear 22 at a plurality of positions in a peripheral direction of an inner periphery, and a locking portion 52 which is provided with outer peripheral projections 52S locking to a stopper 60 provided in the gear housing 11 (11B) and formed as a pointed shape, at a plurality of positions in a peripheral direction of an outer periphery.

In this case, the boss portion 51 of the rotation preventing arm 50 is formed as a cylindrical shape. A grip portion 53 is radially protruded from a plurality of positions (for example, three positions) of a tube outer periphery in a base end side of the boss portion 51, and a locking portion 52 is radially protruded from a plurality of positions (for example, three positions) of a tube outer periphery in a leading end side of the boss portion 51. A worker serration-connects an inner peripheral projection 51S of the boss portion 51 to a serration 22S of the gear shaft 22A of the worm gear 22, and locks the outer peripheral projection 52S of each of the locking portions 52 in the leading end side of the boss portion 51 to each of stoppers 60 (tool engaging surfaces 61 mentioned later) provided in the gear housing 11 (11B), in a state of gripping each of the grip portions 53 in a base end side of the boss portion 51, at a time of forming the rotation prevention in which the rotation preventing arm 50 is loaded to the gear housing 11.

At this time, each of the stoppers 60 which are provided in the gear housing 11 (11B) is constructed by the tool engaging surface 61 which is formed by each of corner portions of an angled hole, for example, a twelve angled hole (hole provided for a special tool) which is provided in the inner periphery of the nut 26 threadably attached by screw to the gear housing 11A by using a special tool, for retaining the bearing 23 to the gear housing 11B. The bearing 23 pivots the gear shaft 22A of the worm gear 22 to the gear housing 11 (11B).

Each of the locking portions 52 of the rotation preventing arm 50 is provided with a protruding portion 52R in both sides of the pointed triangular chevron shaped outer peripheral projection 52S which locks to the corner portion of the tool engaging surface 61 constructing each of the stoppers 60, brings the protruding portions 52R in both sides of the outer peripheral projection 52S into pressure contact with both side ridge surfaces of an apex of the corner portion of the tool engaging surface 61 at a time when the outer peripheral projection 52S is locked to the apex of the corner portion of the tool engaging surface 61. A loaded state (the rotation prevention forming state) of the rotation preventing arm 50 to the gear housing 11 is maintained on the basis of a fastening margin generated in the protruding portion 52R.

In this case, in a state in which the rotation preventing arm 50 is loaded to the gear housing 11 (11B), and the worm gear 22 is prevented from being rotated with respect to the gear housing 11B, the rotation preventing arm 50 is structured such that the motor case 21 of the electric motor 20 is attached in the gear housing 11B, and is accommodated in the inner portion of the cup-shaped portion 11D (FIG. 5A and FIG. 5B) in which the coupling or the like for connecting to the electric motor 20 is accommodated. The rotation preventing arm 50 is accommodated in the inner portion of the cup-shaped portion 11D rather than a flat surface which includes an open end surface to which the motor case 21 of the cup-shapes portion 11D is attached, and is prevented from protruding to an external portion from the cup-shaped portion 11D so as to come into collision with the peripheral article.

Further, it is preferable that the rotation preventing arm 50 is constructed by an easily deflecting material such as a plastic or the like, and can be repeatedly and easily loaded, and attached and detached to the gear housing 11 (11B).

In accordance with the present embodiment, the following operations and effects can be achieved.

(a) In the intermediate assembled state in which the input shaft 12, the output shaft 14, the torsion bar 13, the worm gear 22, the worm wheel 25, the torque detecting device 30 and the spiral cable 40 are assembled into the gear housing 11 (11B), and the electric motor 20 is not assembled yet, the rotation preventing structure prevents the worm gear 22 from being rotated is loaded with respect to the gear housing 11 (11B). Accordingly, in the intermediate assembly handling stage in which the input shaft 12, the output shaft 14 and the gear shaft 22A of the worm gear 22 are exposed to the outer portion of the gear housing 11 (11B), even if the external rotating force acts on these shafts, the rotation preventing structure regulates the free rotation of these shafts. In accordance with this, the winding state of the spiral cable 40 is maintained in the neutral state, and an abnormal winding of the spiral cable 40 is prevented. An abnormal increase of the number of winding of the spiral cable 40 is avoided, a disconnection of the spiral cable 40 is not caused, and a torque detecting function is not deteriorated. In the case that the number of winding is decreased, the spiral cable 40 is stuck fast to the spiral cable cover 41, and an increase of a steering torque is caused.

(b) The rotation preventing structure is constructed by the rotation preventing arm 50, and the rotation preventing arm 50 has the boss portion 51 which is coupled to the serration 22S provided in the gear shaft 22A of the worm gear 22, and the locking portion 52 which locks to the stopper 60 provided in the gear housing 11 (11B).

It is possible to easily regulate the free rotation of the gear shaft 22A of the worm gear 22, and further the input shaft 12 and the output shaft 14, by coupling the boss portion 51 of the rotation preventing arm 50 to the serration 22S provided in the gear shaft 22A of the worm gear 22, and locking the locking portion 52 to the stopper 60 provided in the gear housing 11 (11B).

(c) The stopper 60 provided in the gear housing 11 (11B) in such a manner that the locking portion 52 of the rotation preventing arm 50 locks thereto is the tool engaging surface 61 which is provided in the inner periphery of the nut 26 threadably attached by screw to the gear housing 11 (11B) for retaining the bearing 23 pivoting the gear shaft 22A of the worm gear 22 to the gear housing 11 (11B) in the gear housing 11 (11B).

The engaging portion of the rotation preventing arm 50 can be locked to the tool engaging surface 61 (the stopper 60) in the inner periphery of the nut 26 which is threadably attached by screw to the gear housing 11 (11B).

(d) In the state in which the rotation preventing arm 50 is loaded, the rotation preventing arm 50 is accommodated in the inner portion of the cup-shaped portion 11D to which the electric motor 20 of the gear housing 11 (11B) is attached.

The rotation preventing arm 50 is accommodated in the inner portion of the cup-shaped portion 11D rather than the flat surface including the open end surface to which the motor case 21 of the cup-shaped portion 11D in the gear housing 11 (11B) is attached, and is prevented from protruding to the external portion from the cup-shaped portion 11D so as to come into collision with the peripheral article.

A different point of a second embodiment from the first embodiment exists in an employment of a rotation preventing arm 70 in place of the rotation preventing arm 50.

The rotation preventing arm 70 has a boss portion 71 which is provided with an inner peripheral projection 71S connected to at least a part of the serration 22S provided in the gear shaft 22A connected to the electric motor 20 of the worm gear 22 at a plurality of positions in a peripheral direction of an inner periphery, and a locking portion 72 which locks to the stopper 60 provided in the gear housing 11 (11B).

In this case, the boss portion 71 of the rotation preventing arm 70 is formed as a cylindrical shape. A grip portion 73 and a locking portion 72 are protruded to an outer side in a radial direction from a tube outer periphery in a base end side of the boss portion 71. In the present embodiment, one locking portion 72 and two grip portions 73 are provided in a protruding manner. The worker serration-connects or retains with a fastening margin the inner peripheral projection 71S of the boss portion 71 to the serration 22S of the gear shaft 22A of the worm gear 22, in a state of gripping the locking portion 72 and each of the grip portions 73 in the base end side of the boss portion 71, at a time of forming the rotation prevention in which the rotation preventing arm 70 is loaded to the gear housing 11, and the worker locks the locking portion 72 to the stopper 60 (a locking convex portion 62 mentioned later) which is provided in the gear housing 11 (11B).

At this time, the stopper 60 provided in the gear housing 11 (11B) is constructed by the locking convex portion 62 which is provided in the inner surface of the cup-shaped portion 11D of the gear housing 11B, and to which the concave portion 72A provided in the locking portion 72 of the rotation preventing arm 70 is fitted.

Figure 8:
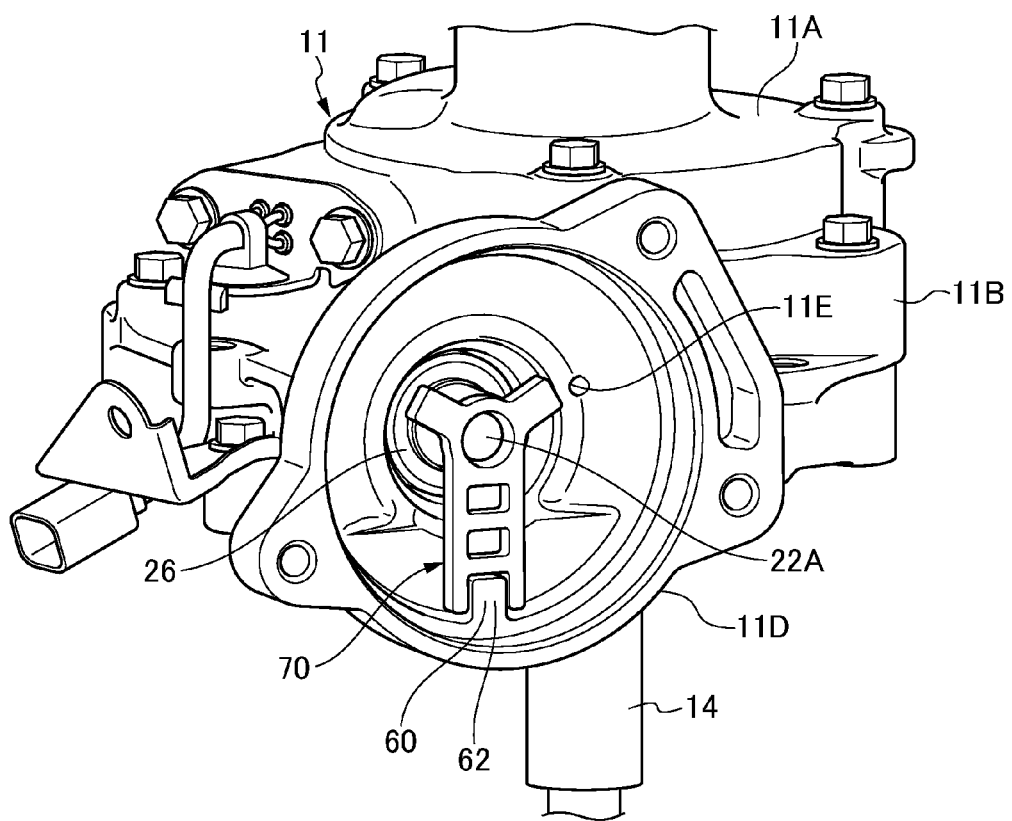
FIG. 8 is a perspective view showing an intermediate assembly of a motor-driven power steering apparatus in accordance with a second embodiment.
Figure 9:
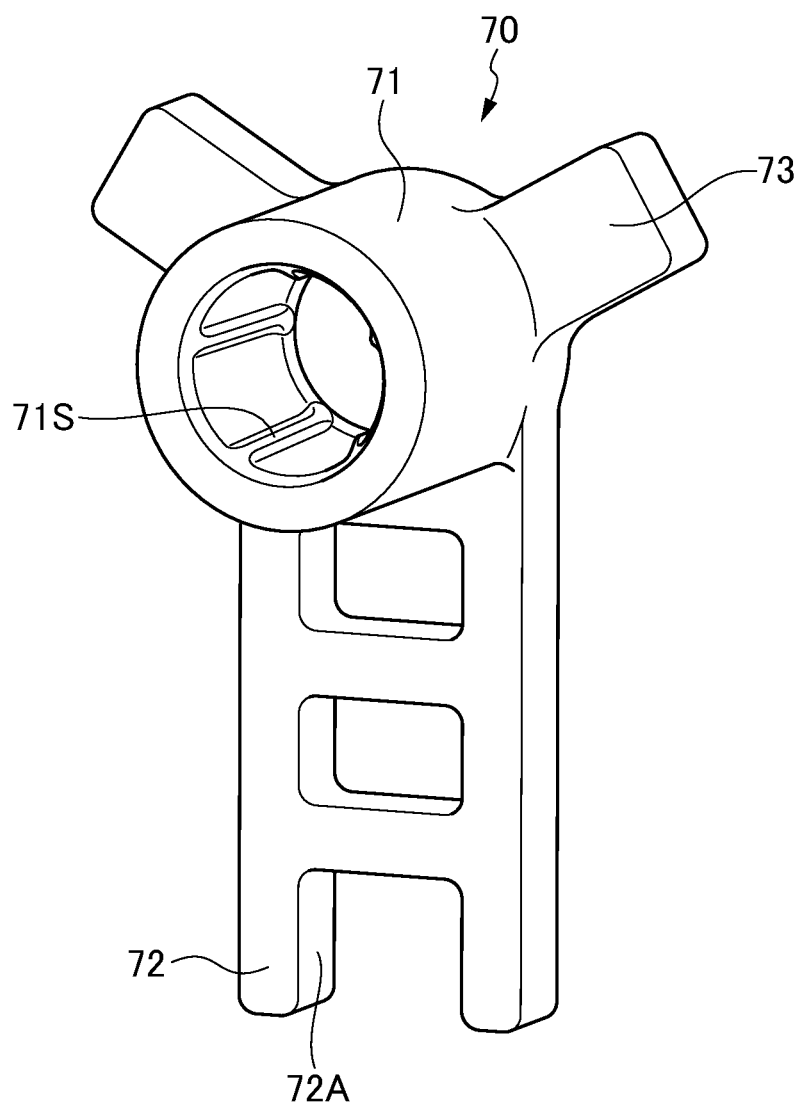
FIG. 9 is a perspective view showing a rotation preventing arm.

In this case, in the state in which the rotation preventing arm 70 is loaded to the gear housing 11 (11B), the rotation preventing arm 70 is accommodated in the inner portion of the cup-shaped portion 11D (FIG. 8) of the gear housing 11B.

Further, it is preferable that the rotation preventing arm 70 is constructed by an easily deflecting material such as a plastic or the like.

In accordance with the present embodiment, in addition to the same operations and effects as those in the first embodiment, the following operation and effect can be achieved.

It is possible to fit and lock the locking portion 72 of the rotation preventing arm 70 to the locking convex portion 62 (the stopper 60) which is provided in the inner surface of the gear housing 11A.

A different point of a third embodiment from the first embodiment exists in an employment of a rotation preventing arm 80 in place of the rotation preventing arm 50.

The rotation preventing arm 80 has a boss portion 81 which is provided with an inner peripheral projection 81S connected to at least a part of the serration 22S provided in the gear shaft 22A connected to the electric motor 20 of the worm gear 22 at a plurality of positions in a peripheral direction of an inner periphery, and a locking portion 82 which is locked to the stopper 60 provided in the gear housing 11 (11B).

In this case, the boss portion 81 of the rotation preventing arm 80 is formed as a cylindrical shape. The fan-shaped locking portion 82 is provided in a protruding manner by being expanded to an outer side in a radial direction from a tube outer periphery in a base end side of the boss portion 81. In the present embodiment, one locking portion 82 is provided in a protruding manner. The worker serration-connects or retains with a fastening margin the inner peripheral projection 81S of the boss portion 81 to the serration 22S of the gear shaft 22A of the worm gear 22 in a state of gripping root portions of the boss portion 81 and the locking portion 82. This occurs at a time of forming the rotation prevention in which the rotation preventing arm 80 is loaded to the gear housing 11, and locks the locking portion 82 to the stopper 60 (a locking surface portion 63 mentioned later) which is provided in the gear housing 11 (11B).

At this time, the stopper 60 provided in the gear housing 11 (11B) is constructed by the locking surface portion 63 which is provided in the inner surface of the cup-shaped portion 11D of the gear housing 11B, and with which the surface portion 82A provided in the locking portion 82 of the rotation preventing arm 80 is engaged.

Figure 10:
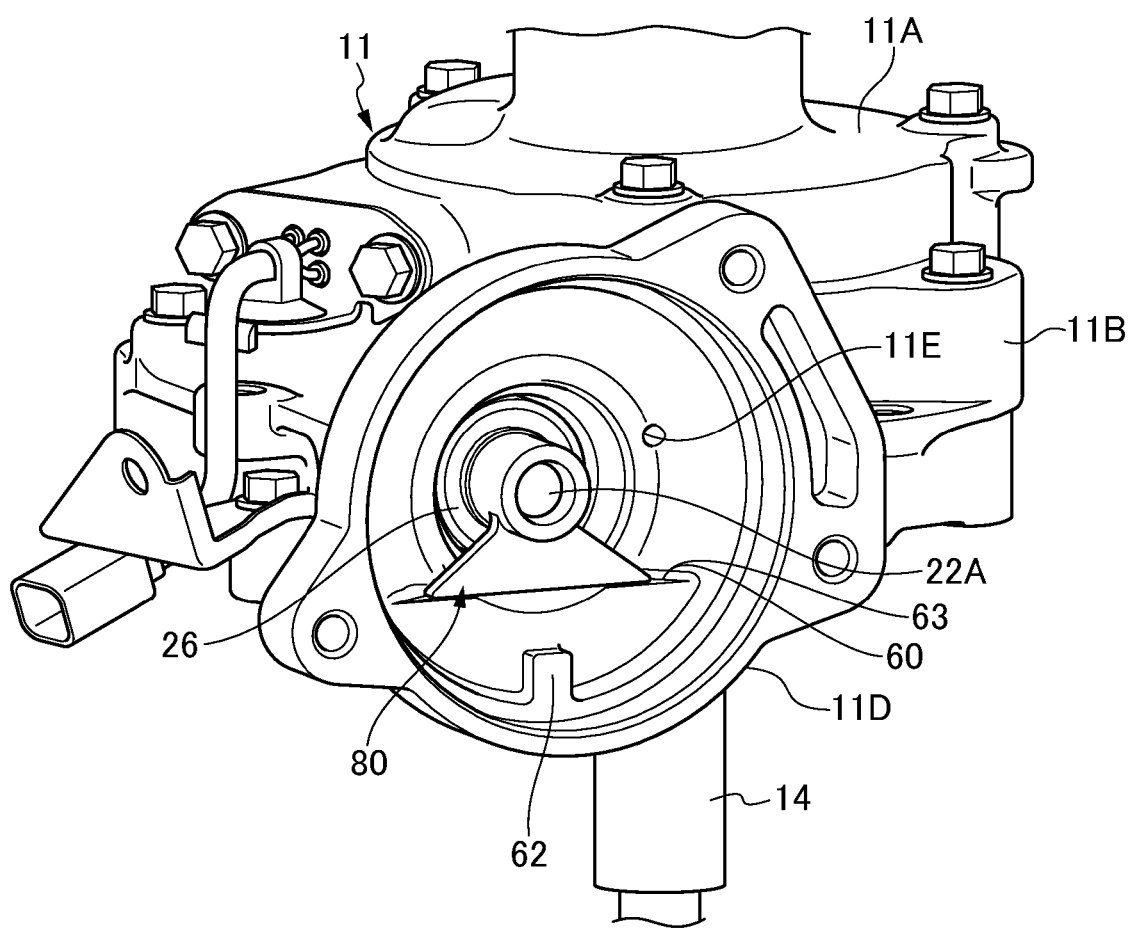
FIG. 10 is a perspective view showing an intermediate assembly of a motor-driven power steering apparatus in accordance with a third embodiment.
Figure 11:
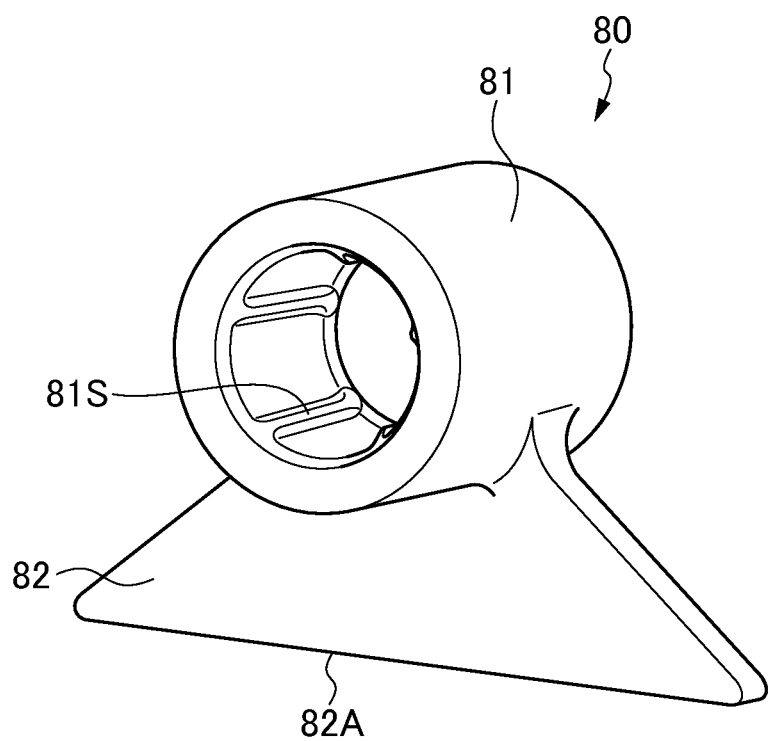
FIG. 11 is a perspective view showing a rotation preventing arm.

In this case, in the state in which the rotation preventing arm 80 is loaded to the gear housing 11 (11B), the rotation preventing arm 80 is accommodated in the inner portion of the cup-shaped portion 11D (FIG. 10) of the gear housing 11A.

Further, it is preferable that the rotation preventing arm 80 is constructed by an easily deflecting material such as a plastic or the like.

In accordance with the present embodiment, in addition to the same operations and effects as those in the first embodiment, the following operation and effect can be achieved.

It is possible to engage and lock the locking portion 82 of the rotation preventing arm 80 with and to the locking surface portion 63 (the stopper 60) which is provided in the inner surface of the gear housing 11B.

A different point of a fourth embodiment from the first embodiment exists in an employment of a rotation preventing arm 90 in place of the rotation preventing arm 50.

The rotation preventing arm 90 has a boss portion 91 which is provided with an inner peripheral projection 91S connected to at least a part of the serration 22S provided in the gear shaft 22A connected to the electric motor 20 of the worm gear 22 at a plurality of positions in a peripheral direction of an inner periphery, and a locking portion 92 which is locked to the stopper 60 provided in the gear housing 11 (11B).

In this case, the boss portion 91 of the rotation preventing arm 90 is formed as a cylindrical shape. A lever portion 92A of a locking portion 92 is provided so as to protrude outward in a radial direction from a tube outer periphery in a base end side of the boss portion 91. A locking pin 92B is provided in a leading end of the lever portion 92A. In the present embodiment, one lever portion 92A is provided in a protruding manner. The worker serration-connects or retains with a fastening margin the inner peripheral projection 91S of the boss portion 91 to the serration 22S of the gear shaft 22A of the worm gear 22, in a state of gripping the boss portion 91 and the lever portion 92A, at a time of forming the rotation prevention in which the rotation preventing arm 90 is loaded to the gear housing 11, and the worker locks the locking portion 92 to the stopper 60 (a locking hole portion 64 mentioned later) which is provided in the gear housing 11 (11B).

At this time, the stopper 60 provided in the gear housing 11 (11B) is constructed by the locking hole portion 64 which is open to an inner surface of the cup-shaped portion 11D of the gear housing 11B, and into which the locking pin 92B of the locking portion 92 of the rotation preventing arm 90 is locked. An airtight testing vent hole 11E (refer to FIG. 8 and FIG. 10) of the gear housing 11B can be utilized as the locking hole portion 64.

Figure 12:
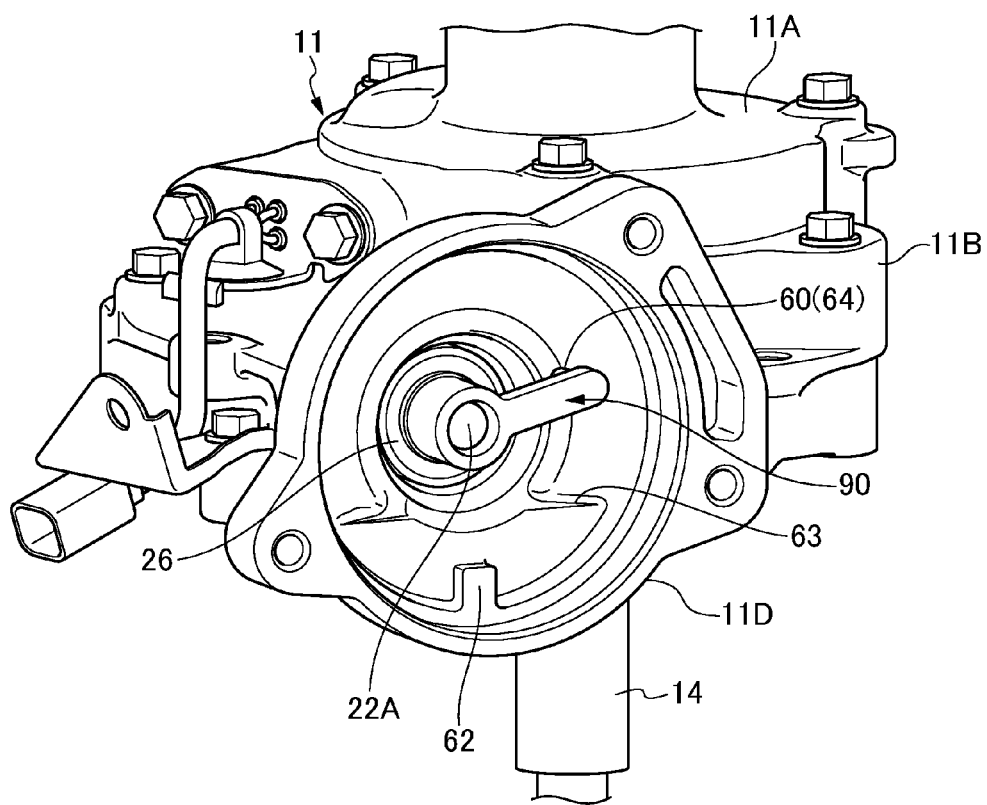
FIG. 12 is a perspective view showing an intermediate assembly of a motor-driven power steering apparatus in accordance with a fourth embodiment.
Figure 13:
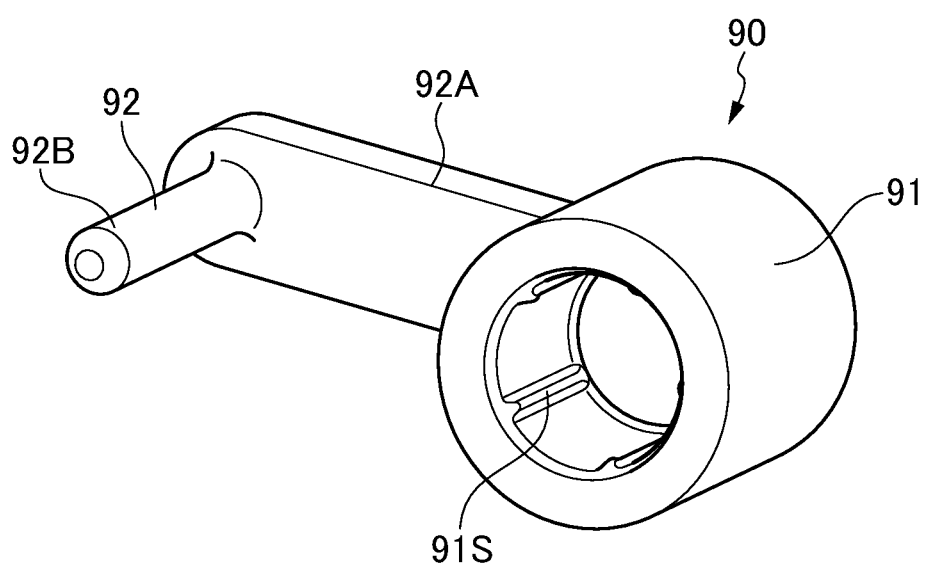
FIG. 13 is a perspective view showing a rotation preventing arm.

In this case, in the state in which the rotation preventing arm 90 is loaded to the gear housing 11 (11B), the rotation preventing arm 90 is accommodated in the inner portion of the cup-shaped portion 11D (FIG. 12) of the gear housing 11B.

Further, it is preferable that the rotation preventing arm 90 is constructed by an easily deflecting material such as a plastic or the like.

In accordance with the present embodiment, in addition to the same operations and effects as those in the first embodiment, the following operation and effect can be achieved.

It is possible to lock the locking portion 92 of the rotation preventing arm 90 into and to the locking hole portion 64 (the stopper 60) which is open to the inner surface of the gear housing 11B.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

In accordance with the present invention, there is provided a motor-driven power steering apparatus comprising an input shaft and an output shaft being coaxially connected via a torsion bar. A drive gear is connected to an electric motor, the drive gear being pivoted to a gear housing. A driven gear engages with the drive gear, the driven gear being fixed to an intermediate portion of the output shaft. A torque detecting structure detects a steering torque applied to the input shaft, the torque detecting structure being provided between the input shaft and the output shaft. A spiral cable is spirally wound around the same axis of the input shaft and the output shaft in an inner portion of the gear housing. One end portion of the spiral cable is connected to the torque detecting structure, another end portion of the spiral cable is connected to a detection result pickup portion. A driving of the electric motor is controlled on the basis of a steering torque which the torque detecting structure detects. In an intermediate assembled state in which the input shaft, the output shaft, the torsion bar, the drive gear, the driven gear, the torque detecting structure and the spiral cable are assembled in the gear housing, and the electric motor is not assembled yet, a rotation preventing structure which prevents the drive gear from rotating is loaded with respect to the gear housing. Accordingly, it is possible to regulate a free rotation of an input shaft, an output shaft and a gear shaft of a drive gear in a handling stage of an intermediate assembly of a motor-driven power steering apparatus, and prevent a spiral cable from being abnormally wound around.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven power steering apparatus comprising:
   an input shaft and an output shaft being coaxially connected via a torsion bar;
   a drive gear connected to an electric motor, the drive gear being pivoted to a gear housing;
   a driven gear engaging with the drive gear, the driven gear being fixed to an intermediate portion of the output shaft;
   a torque detecting structure detecting a steering torque applied to the input shaft, the torque detecting structure being provided between the input shaft and the output shaft;
   a spiral cable spirally wound around a same axis of the input shaft and the output shaft in an inner portion of the gear housing; and
   one end portion of the spiral cable being connected to the torque detecting structure, another end portion of the spiral cable being connected to a torque detection result pickup portion, and driving of the electric motor being controlled on the basis of the steering torque which the torque detecting structure detects,
   wherein a rotation preventing structure is installed in the gear housing which prevents the drive gear from rotating with respect to the gear housing.

2. The motor-driven power steering apparatus as claimed in claim 1, wherein the rotation preventing structure is a rotation preventing arm, and
   wherein the rotation preventing arm has a boss portion which is coupled to a serration provided in a gear shaft of the drive gear, and a locking portion which locks to a stopper provided in the gear housing.

3. The motor-driven power steering apparatus as claimed in claim 2, wherein the boss portion of the rotation preventing arm is provided with an inner peripheral projection which is connected to at least a part of the serration provided in the gear shaft of the drive gear at a plurality of positions in a peripheral direction of an inner periphery of the boss portion, and wherein the locking portion is provided with an outer peripheral projection which locks to the stopper provided in the gear housing.

4. The motor-driven power steering apparatus as claimed in claim 3, wherein the boss portion of the rotation preventing arm has a cylindrical shape, a grip portion is radially protruded from a plurality of positions in a tube outer periphery in a base end side of the boss portion, and the locking portion is radially protruded from a plurality of positions of a tube outer periphery in a leading end side of the boss portion.

5. The motor-driven power steering apparatus as claimed in claim 4, wherein in a state in which the rotation preventing arm is installed, the rotation preventing arm is accommodated in an inner portion of a cup-shaped portion to which the electric motor of the gear housing is attached.

6. The motor-driven power steering apparatus as claimed in claim 3, wherein in a state in which the rotation preventing arm is installed, the rotation preventing arm is accommodated in an inner portion of a cup-shaped portion to which the electric motor of the gear housing is attached.

7. The motor-driven power steering apparatus as claimed in claim 3, wherein the drive gear is a worm gear.

8. The motor-driven power steering apparatus as claimed in claim 2, wherein the boss portion of the rotation preventing arm has a cylindrical shape, a grip portion is radially protruded from a plurality of positions in a tube outer periphery in a base end side of the boss portion, and the locking portion is radially protruded from a plurality of positions of a tube outer periphery in a leading end side of the boss portion.

9. The motor-driven power steering apparatus as claimed in claim 8, wherein in a state in which the rotation preventing arm is installed, the rotation preventing arm is accommodated in an inner portion of a cup-shaped portion to which the electric motor of the gear housing is attached.

10. The motor-driven power steering apparatus as claimed in claim 8, wherein the drive gear is a worm gear.

11. The motor-driven power steering apparatus as claimed in claim 2, wherein the stopper is provided in the gear housing in such a manner that the locking portion of the rotation preventing arm which locks thereto is a tool engaging surface which is provided in an inner periphery of a nut threadably attached by a screw to the gear housing for retaining a bearing in the gear housing, and the bearing pivots the gear shaft of the drive gear to the gear housing.

12. The motor-driven power steering apparatus as claimed in claim 11, wherein in a state in which the rotation preventing arm is installed, the rotation preventing arm is accommodated in an inner portion of a cup-shaped portion to which the electric motor of the gear housing is attached.

13. The motor-driven power steering apparatus as claimed in claim 2, wherein the stopper is provided in the gear housing in such a manner that the locking portion of the rotation preventing arm which locks thereto is a locking convex portion which is provided in an inner surface of the gear housing and to which the locking portion of the rotation preventing arm is fitted.

14. The motor-driven power steering apparatus as claimed in claim 13, wherein the boss portion of the rotation preventing arm has a cylindrical shape, a grip portion and the locking portion is protruded to an outer side in a radial direction from a tube outer peripheral in a base end side of the boss portion, and a concave portion provided in the locking portion is fitted to the locking convex portion.

15. The motor-driven power steering apparatus as claimed in claim 2, wherein the stopper is provided in the gear housing in such a manner that the locking portion of the rotation preventing arm which locks thereto is a locking hole portion which is open to an inner surface of the gear housing, and into which the locking portion of the rotation preventing arm is locked.

16. The motor-driven power steering apparatus as claimed in claim 15, wherein the boss portion of the rotation preventing arm has a cylindrical shape, a lever portion of the locking portion is protruded to an outer side in a radial direction from a tube outer periphery in a base end side of the boss portion, a locking pin is provided in a leading end of the lever portion, and the locking pin is locked to the locking hole portion.

17. The motor-driven power steering apparatus as claimed in claim 2, wherein the stopper is provided in the gear housing in such a manner that the locking portion of the rotation preventing arm which locks thereto is a locking surface portion which is provided in an inner surface of the gear housing, and with which the locking portion of the rotation preventing arm is engaged.

18. The motor-driven power steering apparatus as claimed in claim 2, wherein in a state in which the rotation preventing arm is installed, the rotation preventing arm is accommodated in an inner portion of a cup-shaped portion to which the electric motor of the gear housing is attached.

19. The motor-driven power steering apparatus as claimed in claim 2, wherein the drive gear is a worm gear.

20. The motor-driven power steering apparatus as claimed in claim 1, wherein the drive gear is a worm gear.

\* \* \* \* \*